US009380238B2

United States Patent
Bell et al.

(10) Patent No.: US 9,380,238 B2
(45) Date of Patent: Jun. 28, 2016

(54) DETECTOR FOR DETERMINING THE LOCATION OF A LASER SPOT

(71) Applicants: Raymond Thomas Bell, Stanmore (GB); Kevin Anthony Derek Hadfield, Chelmsford (GB)

(72) Inventors: Raymond Thomas Bell, Stanmore (GB); Kevin Anthony Derek Hadfield, Chelmsford (GB)

(73) Assignee: E2V TECHNOLOGIES (UK) LIMITED, Chelmsford (GB)

( * ) Notice: Subject to any disclaimer, the term of this patent is extended or adjusted under 35 U.S.C. 154(b) by 0 days.

(21) Appl. No.: 14/361,910

(22) PCT Filed: Nov. 28, 2012

(86) PCT No.: PCT/GB2012/000869
§ 371 (c)(1),
(2) Date: May 30, 2014

(87) PCT Pub. No.: WO2013/079900
PCT Pub. Date: Jun. 6, 2013

(65) Prior Publication Data
US 2014/0320721 A1 Oct. 30, 2014

(30) Foreign Application Priority Data

Dec. 1, 2011 (GB) .................................. 1120801.4

(51) Int. Cl.
*H04N 5/372* (2011.01)
*H04N 5/3722* (2011.01)

(52) U.S. Cl.
CPC ......... *H04N 5/37213* (2013.01); *H04N 5/3722* (2013.01)

(58) Field of Classification Search
CPC ............ H04N 5/37213; H04N 3/1575; H04N 5/3722; G06K 9/52
See application file for complete search history.

(56) References Cited

U.S. PATENT DOCUMENTS 5,557,097 A * 9/1996 Ortyn et al. ................ 250/201.3
2013/0147916 A1 * 6/2013 Bennett et al. ................ 348/46

FOREIGN PATENT DOCUMENTS

| EP | 1126698 A1 | 8/2001 |
| GB | 2461042 A | 12/2009 |
| JP | 2010004577 A | 1/2010 |
| WO | 2011055117 A1 | 5/2011 |

* cited by examiner

*Primary Examiner* — Christopher K Peterson
(74) *Attorney, Agent, or Firm* — Lando & Anastasi, LLP

(57) ABSTRACT

A detector for determining the location of a pulsed laser spot reflected from a scene, which comprises a CCD sensor for imaging the scene comprising an array of pixels arranged in rows (R1, R2, R3) and columns (C1, C2, C3), a serial read-out register arrangement (not shown), and charge transfer electrodes (Ø1H, Ø1V, Ø2) capable of transferring signal charge in at least two adjacent pixels to read-out register arrangement locations representative of the row location of at least one of the adjacent pixels and the column location of at least one other of the adjacent pixels. The charge transfer electrodes are two phase, but three or more phase arrangements are also possible.

17 Claims, 11 Drawing Sheets

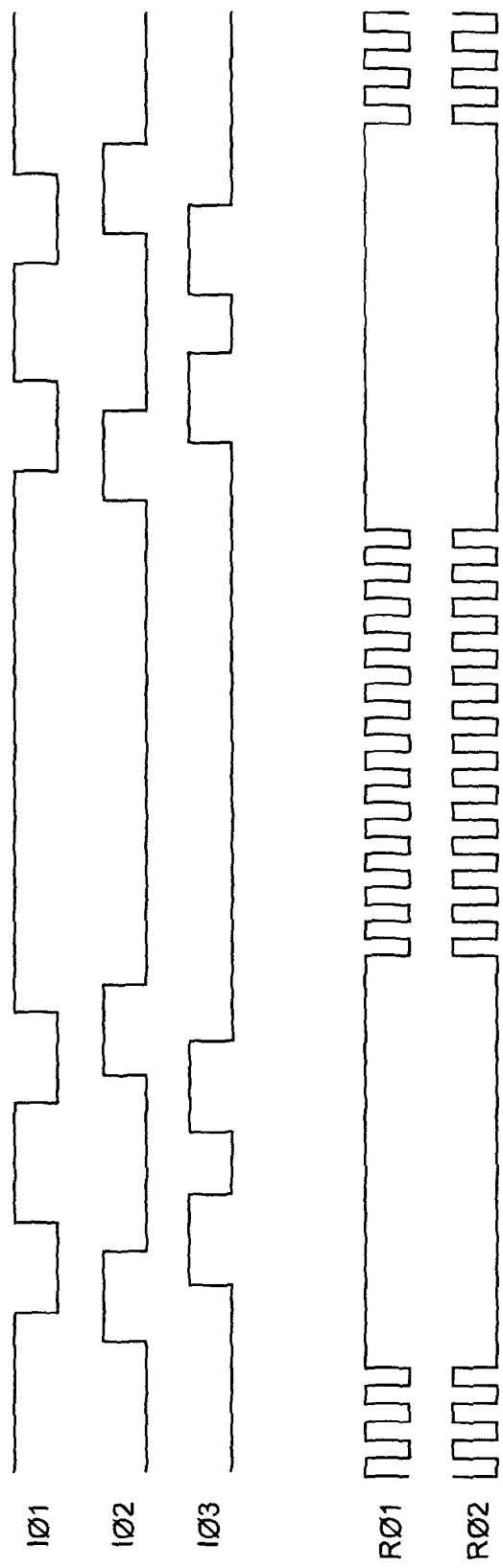

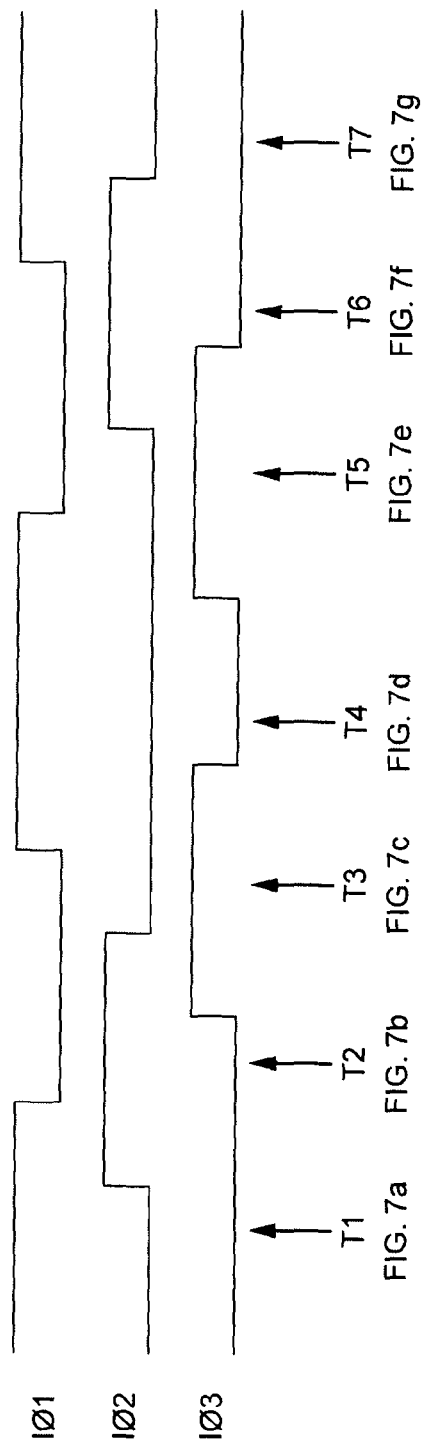

DETECTOR FOR DETERMINING THE LOCATION OF A LASER SPOT

This invention relates to detectors for determining the location of a pulsed laser spot reflected from a scene.

There is a requirement to be able to image a scene and to locate a reflected pulsed infrared laser spot within the scene. Once located, the temporal spacing of the laser pulses needs to be measured. Typical pulse widths can be microseconds or fractions thereof, and the spacing between the pulses can range from milliseconds to seconds. Detectors using a silicon photodiode device organised as a quadrant detector have been used, but these provide only crude positional information. It has also been proposed (U.S. Pat. No. 6,288,383) to use a CCD image sensor of the frame transfer type, but a disadvantage is that if a pulse is incident on the CCD sensor during the frame transfer period, it will lead to an incorrect spot location. This disadvantage is avoided in a device to obtain the positional and temporal information using two separate CCD sensors illuminated with the same image of the spot, for example, by means of a beam-splitter (WO 2011/055117), the charge transfer directions being orthogonal to each other, but this device is more difficult to fabricate.

According to a first aspect of the invention there is provided a detector for determining the location of a pulsed laser spot reflected from a scene, which comprises a CCD sensor for imaging the scene comprising an array of pixels arranged in rows and columns, a serial read-out register arrangement, and charge transfer electrodes capable of transferring signal charge packets in pairs of adjacent pixels to read-out register arrangement locations representative of the row location of respective ones of the pairs and the column location of the respective others. The laser output is typically infrared but other wavelengths, such as in the visible range, may be appropriate for some applications.

In one embodiment, the positional location of a pulsed spot can be determined using a single layer sensor. In another embodiment, the detector comprises a dual layer sensor but this is a more complex structure and hence may be less advantageous.

The pixels of the pairs from which row location is derived may be arranged in different rows of the array to the pixels of the pairs from which column location is derived. Similarly, the pixels of the pairs from which column location is derived may be arranged in different columns of the array to the pixels of the pairs from which row location is derived. Row and column information can then be clocked in step along rows and columns, the row and column signal charge packets being presented alternately to electrodes at the intersections of the rows and columns.

Alternatively, the pixels of the pairs from which row and column location is derived may be arranged in the same rows as each other. The pixels from which row and column location is derived may alternate with each other along rows and along columns of the array. There may be three-phase charge transfer electrodes, the regions between the pixels from which row and column information is derived in both the row and column direction having electrodes corresponding to two of the phases, which are alternately reversed in order. A corresponding cycle of clocking voltages containing two sequences with the second and third phase reversed then enables the signal charge packets to move simultaneously in orthogonal directions with the row and column signal charge packets being maintained independent of one another.

According to a second aspect of the invention, an arrangement includes a detector system including a detector as claimed in any preceding claim and a laser source for generating the laser spot.

Ways of carrying out the invention will now be described in greater detail, by way of example, with reference to the accompanying drawings, in which:

FIG. 6 is a clocking sequence for the second embodiment;

FIG. 8 shows the clocking sequence for the second embodiment in detail;

In one embodiment, a detector is used to detect the location and temporal spacing of a pulsed laser spot reflected from a scene, the laser spot being imaged on the detector which is arranged to be sensitive at the laser wavelength. The scene may also be illuminated by other sources, for example, sunlight, another artificial source or moonlight. Any background illumination on the scene from sources other than the pulsed laser will degrade the signal to noise ratio of the laser pulse due to the random noise (photon shot noise) associated with the background. This degradation is minimised by use of a narrow optical bandpass filter at the front of the detector, the filter being tuned to pass the laser wavelength only. The detector comprises a CCD having an array of pixels arranged in rows and columns. The signal charge from the pulsed spot is collected in at least two adjoining pixels of the CCD, for example, because of the size of the spot at the CCD compared to the pixel dimensions. By means of a special arrangement of charge transfer electrodes and ion-implanted barriers in the CCD and a specific clocking sequence, some charge signal from the spot is transferred as a signal charge packet in the row direction and some charge signal from the same spot is independently transferred as a signal charge packet in the column direction. A readout register arrangement comprising two independent readout registers along adjoining edges of the array receives the signal charge packets and is used to clock them to output circuits for detection in the conventional manner.

To ensure that signal charge from the pulsed spot is collected in at least two adjoining to pixels, an optics system may be arranged to produce a defocused image of the spot on the detector, that is, by focusing an image in front of, or behind, the light responsive region of the detector. In an alternative approach, the point spread function due to diffusion of charge in undepleted silicon before collection in a potential well is arranged to be approximately a pixel pitch. The thickness of the undepleted silicon beneath all the electrodes depends on the total silicon thickness, its bias potential and its resistivity (doping level) which may be selected to give the desired point spread function. Little or no spread would of course occur in the depleted region immediately under the electrodes.

Figure 1:
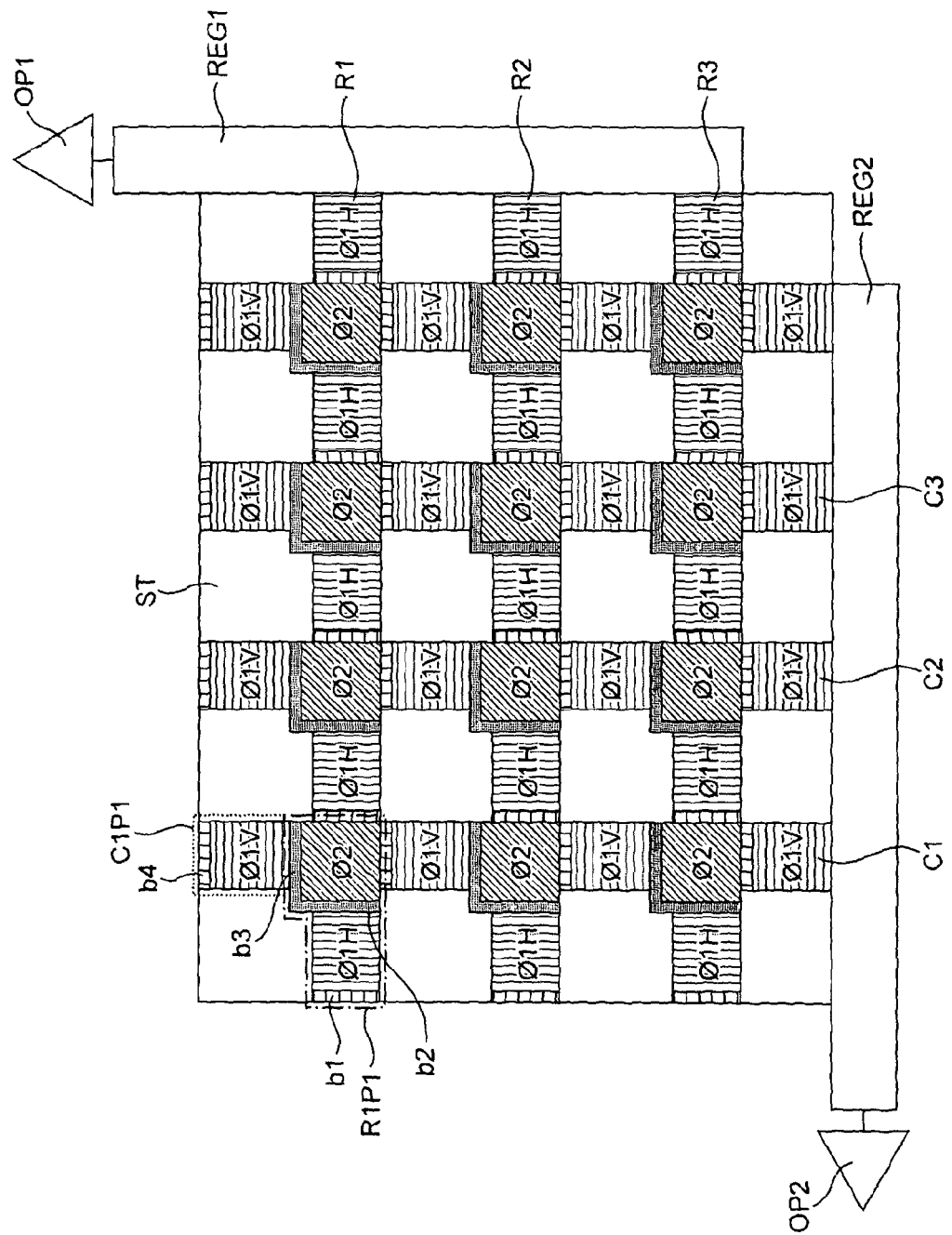
FIG. 1 is a schematic plan view of a first embodiment of a single layer detector in accordance with the invention.

A first example of a CCD architecture which could be used to implement the concept is shown in FIG. 1. Only three rows R1, R2, R3 and three columns C1, C2, C3 are shown, but in practice the array would typically be tens or hundreds of rows by tens or hundreds of columns (for example, 256 by 256). The clocking of both rows and columns is two phase.

Thus, row pixel R1P1 is composed of two polysilicon electrodes Ø1H and Ø2 together with their associated ion-implanted barriers b1 and b2 which comprise a two phase CCD element. This pixel is isolated in the orthogonal direction by the barrier b3 associated with Ø2, the barrier b4 associated with Ø1V between rows R1 and R2, and by two isolation regions. One of the isolation regions, between columns C2, C3, is designated ST. Barrier b1 lies underneath polysilicon electrode Ø1H, and barriers b2 and b3 lie underneath polysilicon electrode Ø2.

Column pixel C1P1 is composed of two polysilicon electrodes Ø1V and Ø2, together with their associated ion-implanted barriers b4 and b3, which comprise a two phase CCD element. This pixel is isolated in the orthogonal direction by the barrier b2 associated with Ø2, the barrier b1 associated with Ø1H between columns C1 and C2, and by two isolation regions ST. Barrier b4 lies underneath polysilicon electrode Ø1V. Thus, row pixel R1P1 and column pixel C1P1 share a common polysilicon electrode Ø2, as well as common ion-implanted barriers b2, b3. Charge is collected under electrodes Ø1H of the row pixels and Ø1V of the column pixels. The Ø1V electrodes lie between adjacent rows, and the Ø1H electrodes similarly lie between adjacent columns. Charge can thus be simultaneously collected under the Ø1H and Ø1V electrodes, and be clocked independently, at alternating times, through the common Ø2 electrodes, allowing both row and column clocking to run at the same time, but phase-offset from each other.

The read-out register arrangement comprises two independent read-out registers REG1, REG2 along the bottom and right-hand side (as seen in FIG. 1) which clock the signal charge packets to output circuits OP1, OP2.

The clocking sequence will now be outlined.

Figure 2:
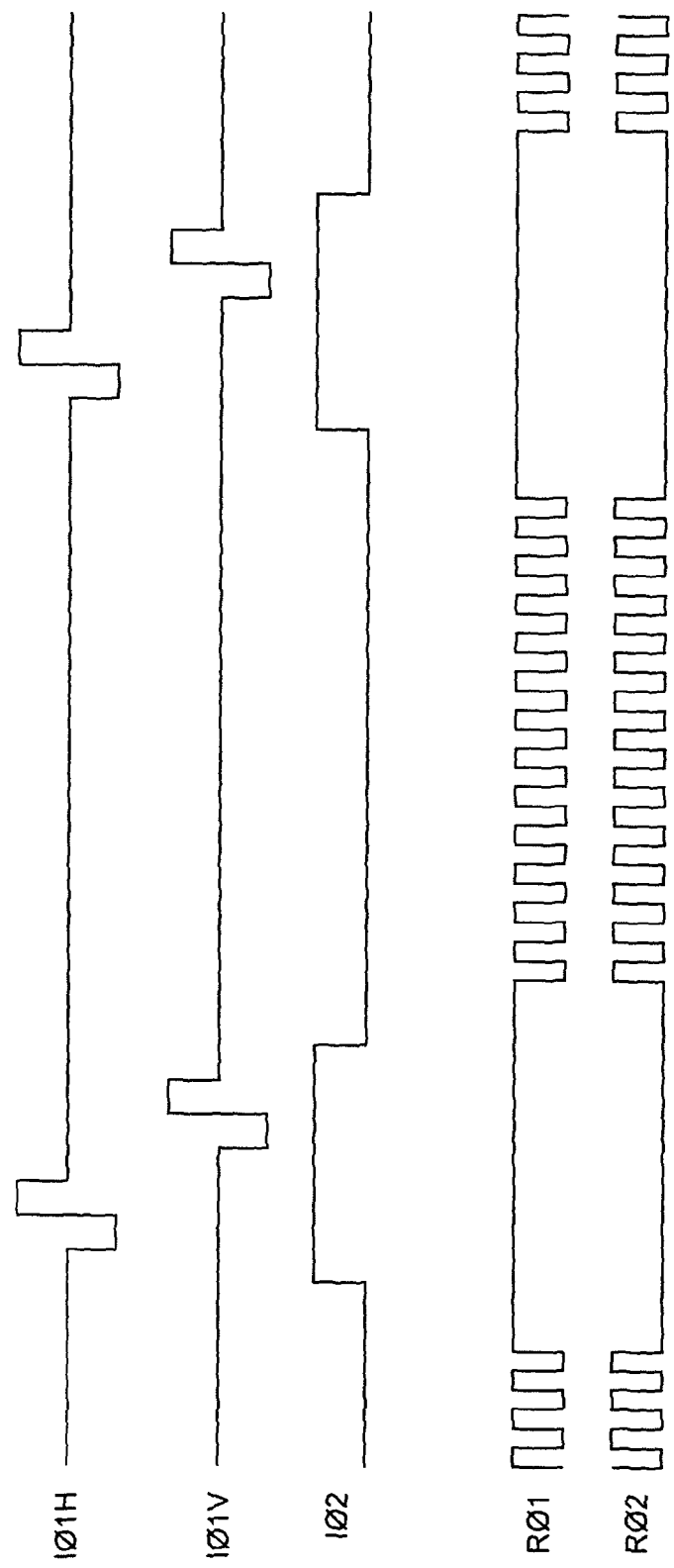
FIG. 2 is a clocking sequence for the first embodiment.

Referring to FIGS. 1 and 2, consider a laser spot illuminating polysilicon electrodes Ø1H and Ø1V of row pixel R1P1 and column pixel C1P1. During the majority of the operating period electrodes Ø1H and Ø1V are at a high positive potential (typically +10V) as shown in FIG. 2, with Ø2 at a low level (typically 0V). The charge photo-generated by the laser spot will be collected in the potential wells under the high electrodes. Charge generated under Ø2 and in the isolation regions will drift laterally to be collected under an adjoining Ø1H or Ø1V. At other times when either Ø1H or Ø1V is low and Ø2 high charge generated under the low electrode will move to the adjacent Ø2 which will also collect charge directly. This signal charge packet will then promptly be transferred to the next Ø1 electrode in the transfer sequence when Ø2 goes low in the normal manner of charge transfer in a CCD. The high Ø1H or Ø1V electrode will collect charge as before. A signal is therefore generated in both horizontal and vertical transferring parts of the pixel at all times in the clocking sequence.

The clocking sequence is shown in FIG. 2, which illustrates an example clocking scheme for a device with a small number of rows or columns. RØ1 and RØ2 represent the clock pulses applied to the read-out registers along two orthogonal edges of the array. These are shown as two-phase. In FIG. 2, thirteen cycles of the register clocks are shown which would be sufficient to read out a small array of fewer than 13 rows and columns. In a practical sensor the number of rows and columns would generally be larger and the number of register clock cycles would be increased correspondingly. In this case the fraction of the operating period occupied by the register clocking would be much greater than that occupied by transfer between rows and columns in the imaging part of the array. The clocking sequence shown in FIG. 2 is repeated continuously, with no separate integration period. The position of the laser spot is calculated from the row and column numbers in which signals are observed in the manner described in WO 2011/055117. The arrival time of the laser pulse is calculated from the time of arrival of the associated signal at the outputs of the readout register and the time taken to transfer the signal through the array calculated from the previously calculated spot position, the number of clock cycles therefore required to bring the signal charge packets to the outputs and the clock timings, in the manner described in WO 2011/055117.

Figure 3:
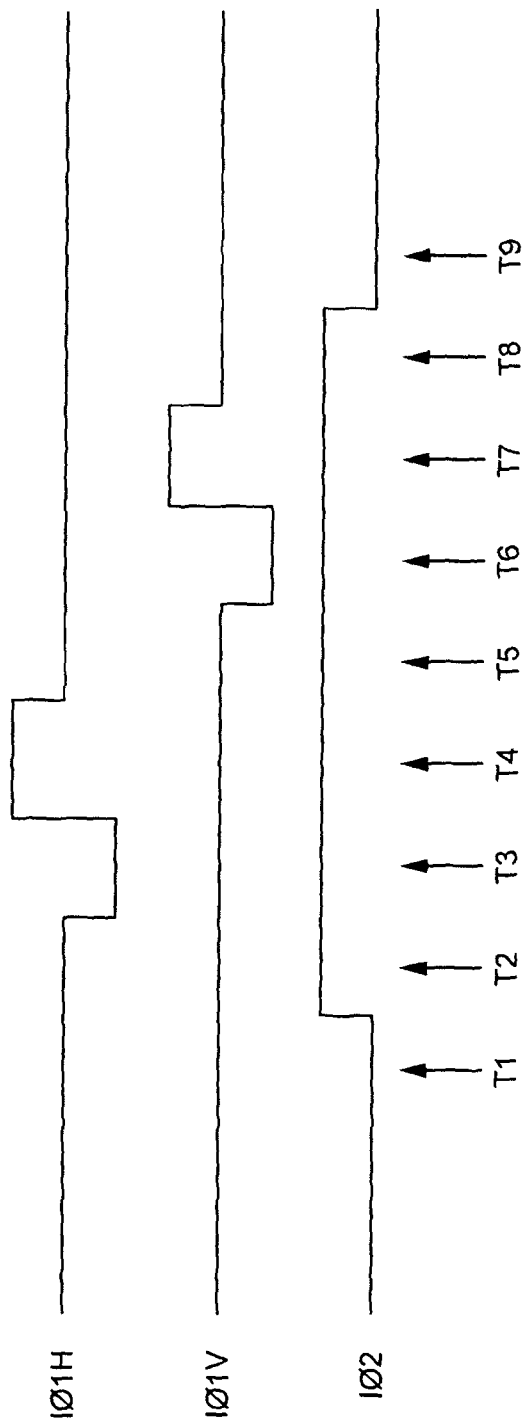
FIG. 3 shows the clocking sequence for the first embodiment in more detail.
Figure 4:
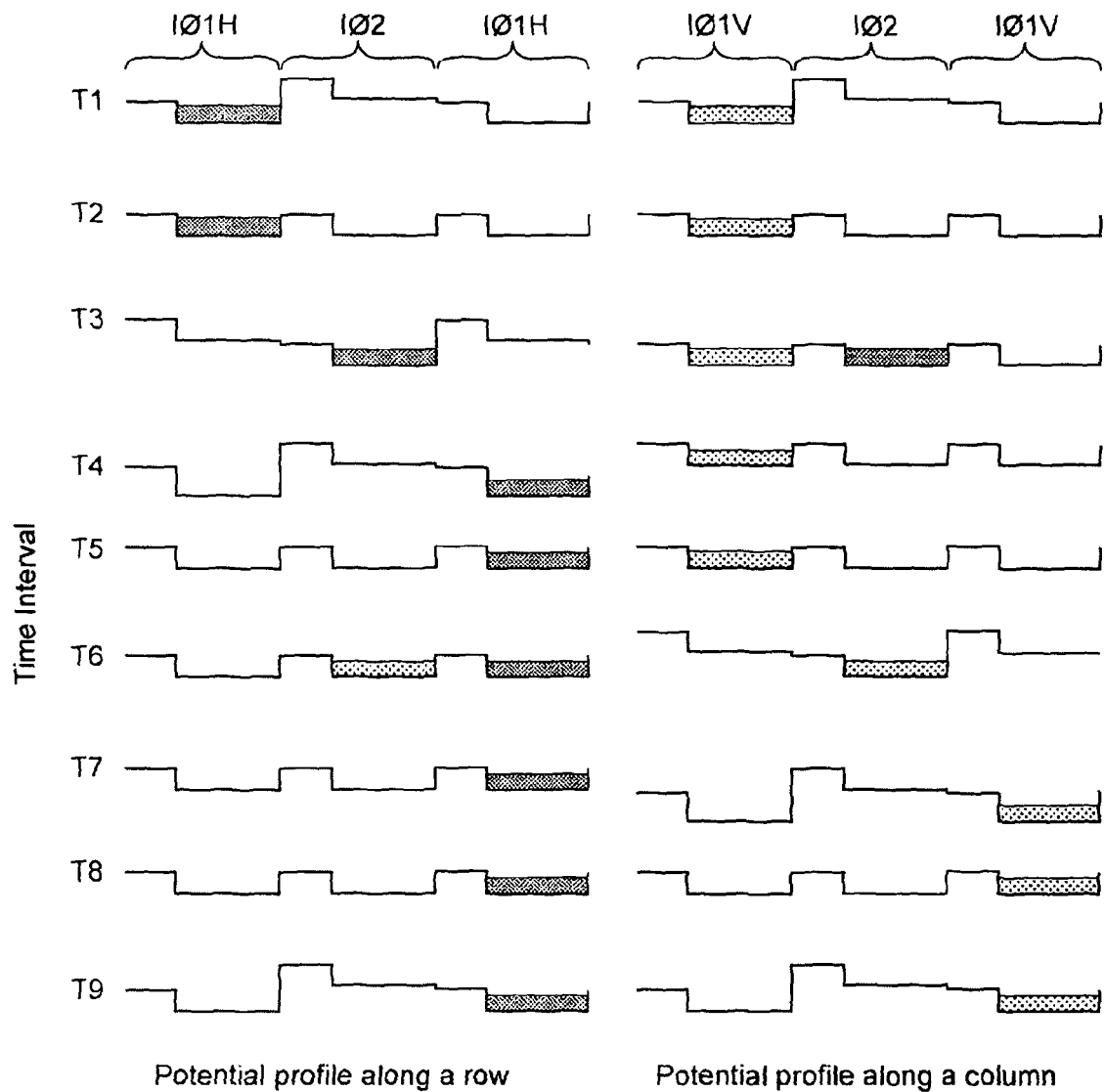
FIG. 4 shows the potential profile in row and column directions of the CCD sensor at time intervals T1-T9 indicated in FIG. 3.
Figure 9:
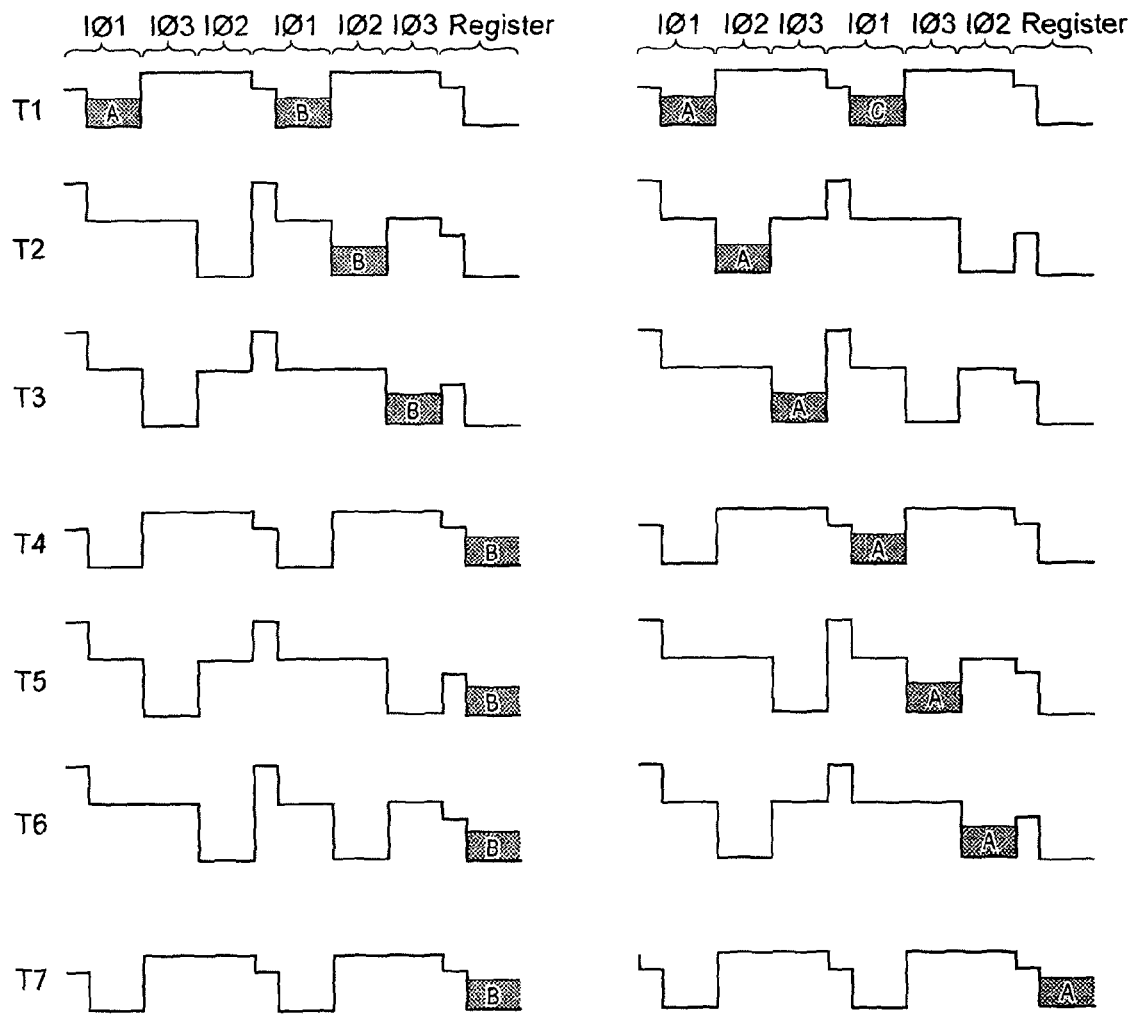
FIG. 9 shows the potential profile in row and column directions of the CCD sensor at time intervals T1-T7 indicated in FIG. 8.

The transfer of charge in both vertical and horizontal directions is described with reference to FIGS. 3 and 4. Potential profiles along a row and a column are shown in FIG. 4, together with the resulting movement of signal charge packets, at various time intervals T1 to T9 as designated in FIG. 3. It should be understood that, in accordance with convention when depicting the operation of CCDs, FIGS. 2, 3, 6 and 8 show increasing positive potential in an upwards direction so that waveforms resemble what would be observed using an oscilloscope. FIGS. 4 and 9 however show increasing positive potential in a downwards direction in order to aid the visualisation of potential wells and the movement of signal charge packets between them. Shaded regions in FIGS. 4 and 9 represent the signal charge packets from a single laser pulse, with the different density of shading indicating signals which are transferred in the two orthogonal directions.

At time T1, signal charge packets from a laser spot are stored under IØ1H and IØ1V in first row and column pixels e.g. those designated R1P1 and C1P1 in FIG. 1. At time T2, IØ2 is taken to a high level, typically 10V, similar to the normal high level of IØ1H and IØ1V. No movement of charge occurs at this time as it is retained by the implanted barriers b1, b2 for row pixel R1P1 and b4, b3 for column pixel C1P1, shown at the left edge of each electrode in FIG. 4. To move signal charge packets horizontally IØ1H is then taken to a low level at time T3 and charge moves to the potential well under IØ2 in a typical transfer manner for a two phase CCD. At time T4 IØ1H is taken to an extra high level typically 20V and charge transfers beneath it from IØ2, the potential under barrier b2 also increasing as it is located under the IØ1H electrode. At time T5 IØ1H returns to its normal high level and the horizontal movement of the signal charge packet by pixel R1P1 is completed. An equivalent sequence involving IØ1V and IØ2 is then performed to independently move the signal charge packets stored under IØ1V by one row vertically over time intervals T6 to T9.

On completion of this sequence signal charge packets originally in the lowest row and rightmost column of the array will have been transferred into the registers; clock signals are next applied to the register to read out the signal charge packets as shown in FIG. 2. It should be clear that the order of horizontal and vertical transfer illustrated here is arbitrary and movement vertically before horizontally may be achieved by a simple rearrangement of the sequence shown in FIG. 3. Other variants of the clocking scheme are also possible but the underlying principles remain the same. It will be noted that signal charge packets associated with both horizontal and vertical pixels, R1P1, C1P1, are stored under common polysilicon electrode IØ2, but at alternating times. Hence, signal charge packets are advanced in alternation in row and column directions, that is, not simultaneously.

Figure 5:
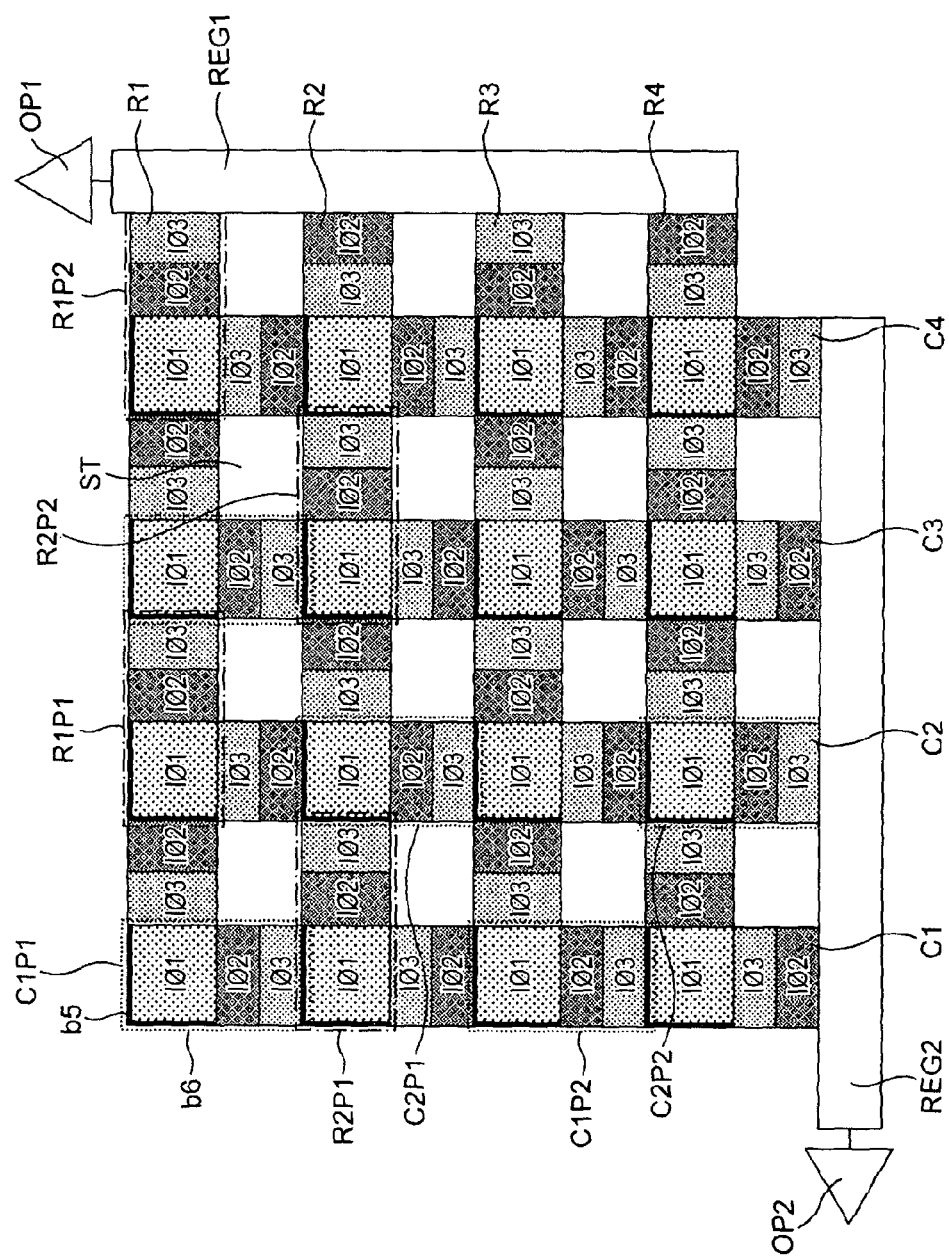
FIG. 5 is a schematic plan view of a second embodiment of a single layer detector in accordance with the invention.

A second example of CCD architecture is shown in FIG. 5. The electrodes are a mixture of standard three-phase and two-phase CCD electrodes. The electrodes designated IØ1 in FIG. 5 are two phase electrodes with an implanted barrier b5, b6 under their upper and left most edges as shown by a heavy black line in FIG. 5. The electrodes designated IØ2 and IØ3 are simple electrodes as used in standard three-phase CCDs without any implanted barrier. For the majority of the operating period of the sensor the IØ1 electrodes are held at a 'high' level with the IØ2 and IØ3 electrodes 'low'. Charge from the spot illumination will be collected under at least two adjoining IØ1 electrodes. A clocking sequence is then applied to the electrodes, which moves adjoining signal charge packets in orthogonal directions while maintaining them independent. An example of a suitable clock sequence is shown in FIG. 6. The resulting movement of independent signal charge packets indicated by letters A to D in a small section of an array due to this clock sequence is shown in FIGS. 7a to 7g.

Referring to FIG. 5, only four rows R1, R2, R3, R4 and four columns C1, C2, C3, C4 are shown, but in practice the array would typically be tens or hundreds of rows by tens or hundreds of columns (for example, 256 by 256). The clocking of both rows and columns is three phase but the additional implanted barriers, b5 and b6, under two edges of the IØ1 electrodes ensure signal charge packets can only move in the rightwards or downwards directions from an IØ1 electrode. Thus, row pixels R1P1, R1P2, R2P1, R2P2 are each defined by three polysilicon electrodes IØ1, IØ2, IØ3 together with two ion-implanted barriers b5, b6. Column pixels C1P1, C1P2, C2P1, C2P2 are also defined by three polysilicon electrodes IØ1, IØ2, IØ3 together with two ion-implanted barriers b5, b6. Thus, row pixels R1P1, R1P2 are interspersed with column pixel C3P1, and row pixels R2P1, R2P2 are interspersed with column pixel C2P1. The read-out register arrangement is also shown in FIG. 5, and comprises two independent read-out registers REG1, REG2 at the bottom and right-hand side of the array (as seen in FIG. 5) which clock the signal charge packets to output circuits OP1, OP2. The isolation regions between the polysilicon electrodes are channel stop regions defining the rows and columns, one of which is designated ST.

The transfer of signal charge packets in both vertical and horizontal directions is described with reference to FIGS. 7a-g, 8 and 9. Potential profiles along a row and a column are shown in FIG. 9, together with the resulting movement of signal charge packets, at various time intervals T1 to T7 as designated in FIG. 8. These time intervals correspond to the states shown in FIG. 7a-g as indicated in FIG. 8.

At time T1, and for the majority of the operating period as shown in FIG. 6, the IØ1 electrodes are high and both IØ2 and IØ3 are low. Any charge signals generated by a laser pulse will be collected and stored under the IØ1 electrodes. To move the signal charge packets IØ2 is first taken to a high state and IØ1 then taken low to reach the state shown at time T2. Signal charge packets will move from under 101 electrodes to an adjacent IØ2 in a normal CCD charge transfer manner. Each IØ1 electrode in a pixel has two adjacent IØ2 electrodes on opposite sides but the presence of the implanted barriers under the upper and leftmost edges of the IØ1 electrodes ensure that signal charge packets A and D move downwards to the adjacent IØ2 electrode below while signal charge packets B and C move to the right. IØ3 is then taken high and IØ2 low to reach the state shown at time T3, and the signal charge packets move to the only adjacent IØ3 electrode in the normal manner. The first half of this sequence is completed by taking IØ1 high and IØ3 low to reach the state shown at time T4. Signal charge packets A and C have now moved to the IØ1 electrode below or to the right of their initial position respectively. Signal charge packets B and D have transferred into the register in this example but would have moved to the IØ1 electrode to the right of or below their initial position respectively if their initial position were in the middle of a larger array. A similar sequence is then performed passing through the states shown as times T5, T6 and T7. The sequence of raising and lowering IØ2 and IØ3 is reversed from that previously used but the same principle that signal charge packets can transfer only downwards or rightwards from an IØ1 electrode to an adjacent high electrode ensures that charge signals A and C continue their downward or rightward transfer respectively to reach the registers in this example. In a larger array signal charge packets A and D would move downwards to the next IØ1 electrode below while signal charge packets B and D would move to the next IØ1 electrode to the right. On completion of this sequence signal charge packets originally in the lowest two rows and rightmost two columns of the array will have been transferred into the registers and clock signals are next applied to the register to read out the signal charge packets as shown in FIG. 6.

Figure 7A:
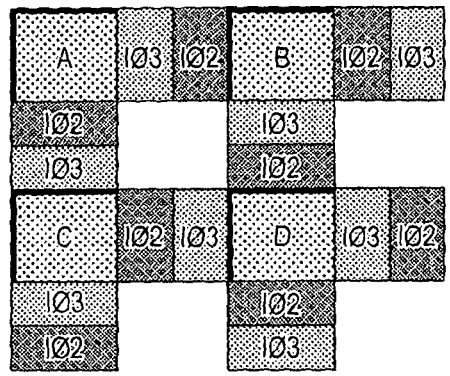
FIGS. 7a to 7g show the movement of signal charge packets in the second embodiment of the invention.
Figure 7B:
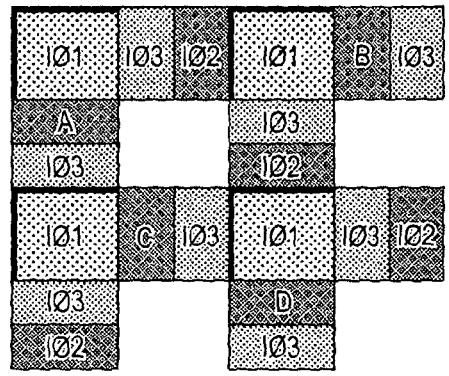
Figure 7C:
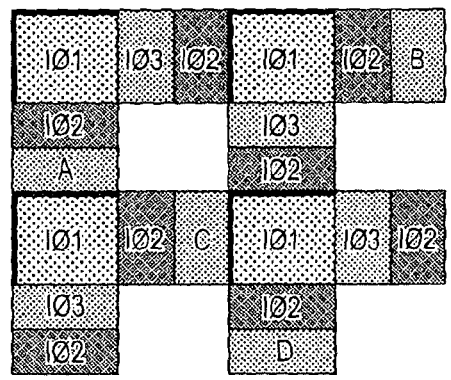
Figure 7D:
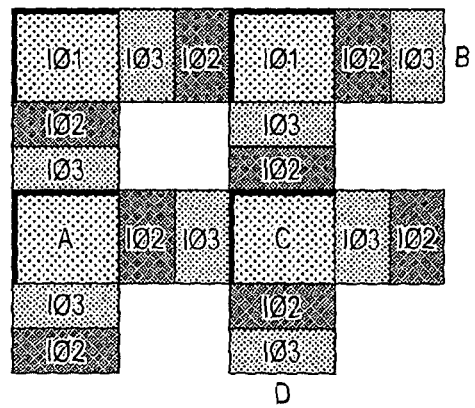
Figure 7E:
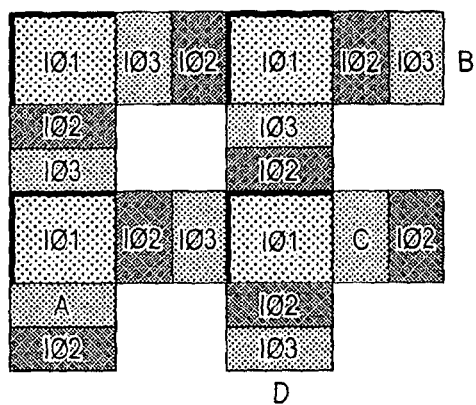
Figure 7F:
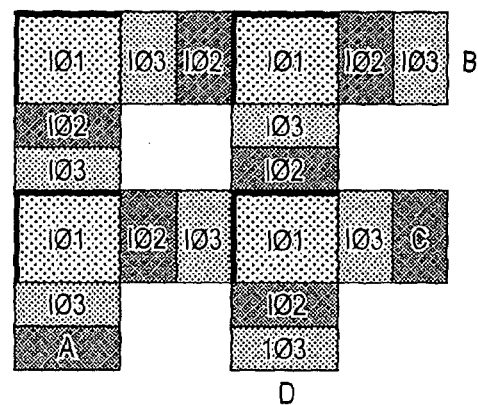
Figure 7G:
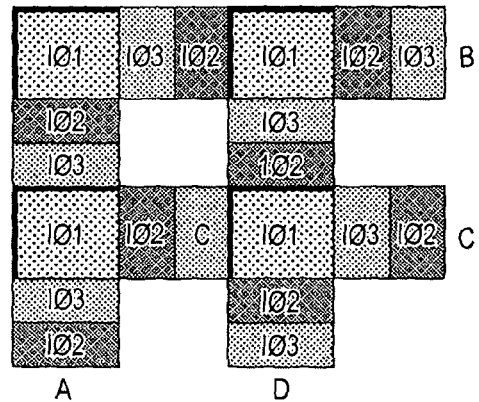

It will be noted that signal charge packets collected along a row alternate between column and row pixels (e.g. C1P1, R1P1, C3P1, R1P2, along row R1), and that signal charge packets collected along a column alternate between column and row pixels (e.g. C1P1, R2P1, C1P2 along column C1). Clocking of signal charge packets along each row and along each column is three phase, but with the second and third electrodes alternating in order between the row and column charge collection sites. The clocking sequence alternately moves charges from the second to the third electrode (so that the row and column signal charge packets advance in the correct direction along the row and column pixels), and then from the third to the second electrode (so that the row and column signal charge packets are clocked through the intervening column and row pixels, e.g. column signal charge packet A corresponding to pixel C1P1 is clocked through row pixel R2P1 (FIGS. 7d-f) to reach column pixel C1P2 (FIG. 7g). In this embodiment the row and column signal charge packets are simultaneously clocked.

Of course, variations may be made without departing from the scope of the invention. Thus, in the first embodiment, the electrodes are shown as two-phase but any standard two, three or four phase CCD register architecture would be possible. Two phase electrodes are desirable for any practical implementation of the ideas with a realistic pixel size but in principle the storage and barrier parts of each electrode could be separated into two independently clocked electrodes at the expense of a considerable increase in complexity. The electrodes are shown as three-phase in the second embodiment, but could instead be any standard two, three or four phase CCD register architecture. In both embodiments, the rows and columns are oriented at 90 degrees to each other, but other orientations of the rows and columns, and of the edges of the array, such as 60 degrees, are possible.

Figure 10:
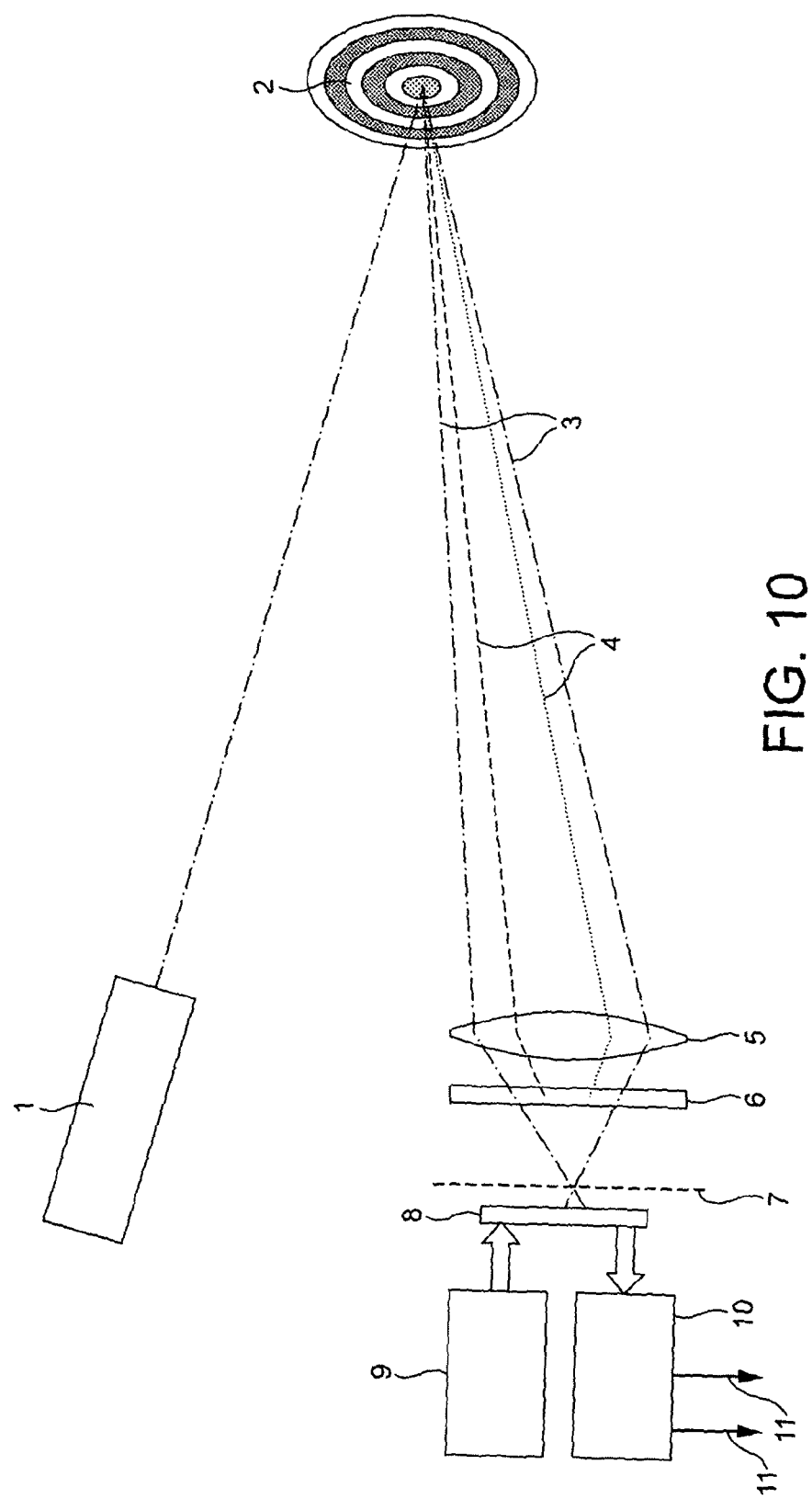
FIG. 10 schematically illustrates an arrangement in accordance with the invention.

With reference to FIG. 10, a detector system including the detector shown in FIG. 1 includes an infrared pulsed laser source 1, the output of which is directed towards a remote target, shown schematically at 2. The laser radiation is reflected from the target 2 as denoted by lines 3 with background light following the path shown by lines 4. An optical arrangement including a lens 5 focuses light from the target 2 via a bandpass filter 6 at a focal plane 7 located in front of the CCD sensor array 8 of the detector. The bandpass filter 6 transmits radiation at the laser wavelength and stops light at other wavelengths.

Drive circuits 9 control the operation of the CCD 8. The output of the CCD 8 is applied to video processing circuits 10 to provide data about the spot position at outputs 11.

In another detector system, the focal plane of the lens is located behind the CCD sensor array 8 or the point spread function of the detector is arranged to be approximately a pixel pitch.

In other detector systems, other detectors in accordance with the invention may be used instead of the detector of FIG. 1.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A detector for determining the location of a pulsed laser spot reflected from a scene, which comprises a CCD sensor for imaging the scene comprising an array of pixels arranged in rows and columns, a serial read-out register arrangement, and charge transfer electrodes capable of transferring signal charge packets from pairs of adjacent pixels to read-out register arrangement locations representative of the row location of respective ones of the pairs and the column location of the respective others, wherein the charge transfer electrodes are arranged to transfer one of each pair of adjacent signal charge packets to the read-out register arrangement along the row direction of the array, and the other along the column direction of the array.

2. A detector as claimed in claim 1, in which the transfer paths in the row and column directions have intersecting charge storage locations arranged to store signal charge packets representative of both row location and column location, but at different times.

3. A detector as claimed in claim 1, in which the read-out register arrangement includes read-out registers along adjacent edges of the array.

4. A detector as claimed in claim 1, including control means for reading out the CCD continuously, with no separate integration period.

5. A detector as claimed in claim 1, in which the pixels of the pairs from which row location is derived are arranged in different rows of the array to the pixels of the pairs from which column location is derived.

6. A detector as claimed in claim 5, in which the rows of the array which generate pixel row location intersect the columns of the array containing the pixels from which column location is derived at regions having charge transfer electrodes capable of transferring signal charge packets in both the row and column direction.

7. A detector as claimed in claim 6, in which the CCD array has two-phase charge transfer electrodes, which are controlled such that transfer of signal charge packets in the row direction alternate with those in the column direction.

8. A detector as claimed in claim 1, in which the pixels of the pairs from which row and column location is derived are arranged in the same rows as each other.

9. A detector as claimed in claim 8, in which the pixels of the pairs of adjacent pixels from which row and column location is derived alternate with each other along rows and along columns of the array.

10. A detector as claimed in claim 9, in which the CCD array has three-phase charge transfer electrodes, and regions between the pixels from which row and column information is derived in both the row and column direction have electrodes corresponding to two of the phases.

11. A detector as claimed in claim 10, in which the order of those two phase electrodes alternates at successive regions along the row direction and in the column direction.

12. A detector as claimed in claim 11, in which each set of three-phase pulses is arranged to be followed by another set in which the order of the second and third phases is reversed.

13. A detector as claimed in claim 10, in which each clocking cycle includes two sequences of the three phase voltages, with the order of the second and third voltage phases reversed between the two sequences.

14. A detector as claimed in claim 1, including a narrow-band optical filter tuned to pass the laser frequency, arranged at the front of the detector.

15. A detector as claimed in claim 1, including means to produce a defocused image of the spot on the detector.

16. A detector as claimed in claim 1, in which the point spread function due to diffusion of charge in undepleted substrate before collection in a potential well is arranged to be approximately a pixel pitch.

17. A detector system including a detector as claimed in claim 1 and further comprising a laser source for generating the laser spot.

* * * * *